(12) United States Patent
Rosendahl et al.

(10) Patent No.: US 9,885,410 B2
(45) Date of Patent: Feb. 6, 2018

(54) UNIT SUPPORT

(71) Applicant: BOGE Elastmetall GmbH, Damme (DE)

(72) Inventors: Marco Rosendahl, Rieste (DE); Jin Han, Bonn (DE); Tim Lamparski, Wallenhorst (DE); Jovan Radakovic, Bonn (DE)

(73) Assignee: BOGE Elastmetall GmbH, Damme (DE)

( * ) Notice: Subject to any disclaimer, the term of this patent is extended or adjusted under 35 U.S.C. 154(b) by 0 days.

(21) Appl. No.: 15/311,329

(22) PCT Filed: May 13, 2015

(86) PCT No.: PCT/EP2015/060596
§ 371 (c)(1),
(2) Date: Nov. 15, 2016

(87) PCT Pub. No.: WO2015/173304
PCT Pub. Date: Nov. 19, 2015

(65) Prior Publication Data
US 2017/0074385 A1  Mar. 16, 2017

(30) Foreign Application Priority Data

May 16, 2014 (DE) .................. 10 2014 209 284

(51) Int. Cl.
*F16M 13/00* (2006.01)
*F16H 57/00* (2012.01)
*B60K 5/12* (2006.01)
*F16F 1/38* (2006.01)
*B60K 17/00* (2006.01)
*F16F 15/08* (2006.01)

(52) U.S. Cl.
CPC ....... *F16H 57/0006* (2013.01); *B60K 5/1208* (2013.01); *B60K 17/00* (2013.01); *F16F 1/3849* (2013.01); *F16F 15/08* (2013.01); *B60Y 2410/113* (2013.01); *F16F 2226/044* (2013.01); *F16H 2057/0012* (2013.01)

(58) Field of Classification Search
USPC ......................................................... 248/580
See application file for complete search history.

(56) References Cited

U.S. PATENT DOCUMENTS

| | | | | |
|---|---|---|---|---|
| 5,460,238 A * | 10/1995 | Burke | .................. | B60K 5/1216 180/299 |
| 6,349,918 B1 * | 2/2002 | Bunker | ................ | B60K 5/1208 248/635 |
| 6,408,974 B1 * | 6/2002 | Viduya | .................. | B62D 21/00 180/312 |
| 6,502,883 B2 * | 1/2003 | Rice | ..................... | B60G 99/004 267/220 |
| 6,698,733 B1 * | 3/2004 | Larmande | ............... | F16F 13/08 267/140.5 |
| 6,752,389 B2 * | 6/2004 | Halladay | ................. | F16F 13/04 267/134 |

(Continued)

*Primary Examiner* — Monica E Millner
(74) *Attorney, Agent, or Firm* — Dinsmore & Shohl LLP

(57) ABSTRACT

A unit support for supporting a drive unit with respect to a motor vehicle includes a crossmember, at least one unit bearing between the crossmember and the drive unit to support the drive unit, and a shape-fitting connection fastening the at least one unit bearing to the crossmember.

15 Claims, 5 Drawing Sheets

(56) References Cited

U.S. PATENT DOCUMENTS

| | | | |
|---|---|---|---|
| 6,988,579 B2* | 1/2006 | Miyahara | F16F 1/38 |
| | | | 180/299 |
| 2006/0108725 A1* | 5/2006 | Ogawa | F16F 1/54 |
| | | | 267/140.13 |
| 2010/0237220 A1* | 9/2010 | Grun | B60K 5/1208 |
| | | | 248/573 |
| 2012/0267184 A1* | 10/2012 | Joly | F16F 1/373 |
| | | | 180/291 |

* cited by examiner

UNIT SUPPORT

FIELD OF THE INVENTION

The invention relates to a unit support, in particular for a motor vehicle, comprising a cross member and at least one unit bearing between the crossmember and a unit.

BACKGROUND OF THE INVENTION

Unit bearings in motor vehicles generally serve to enable vibrations or relative movements between a drive unit, e.g. a transmission, and the vehicle body. These relative movements should, however, not only be damped, but should also be limited in distance or deflection to avoid parts of the drive unit abutting the vehicle body in an unwanted manner. In addition, the vibrations emanating from the internal combustion engine or from the transmission and causing noise are kept away from the body and thus from the vehicle interior by the unit bearings.

Transmission bearings are generally designed in a combination of transmission crossmembers, rubber-metal transmission bearings, and possibly an additional transmission fastener. These components—with the exception of the rubber parts—have previously been designed in aluminum.

A unit bearing is known form DE 10 2009 044 529 A1 in which a crossmember and a unit bearing housing comprise plastic and are connected to one another with material continuity. The connection with material continuity is established by adhesive bonding or by welding. The unit bearing thus forms a single-part, fixed component. The number of individual parts should hereby be reduced and the unit bearing should be better protected against slipping with respect to a reception at the body or at the frame of a motor vehicle.

However, the relatively high manufacturing effort and/or cost in comparison with known aluminum unit bearings can be considered a disadvantage.

SUMMARY OF THE INVENTION

Starting from this, it is an object of the present invention to provide a unit support of the initially named kind which is easier to manufacture. A unit support of the initially named kind should preferably be provided in which loads acting on the unit can be reliably led off onto the body of a motor vehicle.

This object is achieved by the invention set forth in claim 1. Advantageous embodiments can be seen from the dependent claims.

In accordance with the invention, a unit support is provided, in particular for a motor vehicle, comprising a crossmember and at least one unit bearing between the crossmember and the unit, wherein the at least one unit bearing can be fastened to the crossmember by a shape-fitting connection.

A shape-fitting connection between the crossmember and the at least one unit bearing can be established relatively simply and is in particular suitable for a manufacture of the crossmember and of the unit bearing of plastic or of a combination of plastic and rubber. Such a shape-fit connection furthermore allows a final assembly of the unit bearing in the assembly of the motor vehicle. The advantage of a possible delivery of the unit support in single parts results from this.

The shape-fit connection is in particular formed by a snap-in connection. A snap-in connection can also be manufactured simply without tools.

In an embodiment, the at least one unit bearing comprises a connection part at which at least one, and in particular at least four, elastically deformable joining part(s) is/are arranged which can each be hooked into respective cut-outs of the crossmember. In this embodiment, the means provided for fastening the unit bearing to the crossmember can be manufactured as a separate component. The connection part can, for example, be produced in a simple and inexpensive manner from plastic in an injection-molding process.

The embodiment with four joining parts per unit bearing is characterized by high stability.

In an embodiment, the joining parts are each formed by a snap-in hook having an elastically deformable latching nose which is latchable with respect to the crossmember. This embodiment makes possible a releasable connection of the at least one unit bearing to the crossmember. The unit bearing can thus, for example, be released from the crossmember in a simple manner for repair purposes.

In an embodiment, the crossmember has a projection for each of the unit bearings, wherein the projection is configured for receiving or fastening the connection part; and/or wherein the cut-outs are arranged in the projection. This embodiment makes possible a simple assembly of the unit bearing at the crossmember with the aid of the connection part.

In a further embodiment, the at least one unit bearing comprises at least one elastomer body for transmitting loads and vibrations between the unit and the crossmember. The elastomer body is in particular composed of rubber. In this embodiment, the unit bearing is configured as a rubber bearing in a bearing housing produced from plastic, for example, whereby vibrations of the unit are damped with respect to the vehicle chassis.

The elastomer body can be arranged at the connection part and can in particular be integrated in the connection part. An assembly of connection part with an elastomer body thus results which can be pre-assembled, whereby the manufacture of the unit support becomes more flexible.

In another embodiment of the invention, the at least one unit bearing comprises a connector part which can be connected to the unit at one end and which comprises a stopper section at the oppositely disposed end, wherein the stopper section can be movably arranged within a recess in the crossmember, wherein the movability of the stopper section is bounded in at least one direction by at least one abutment surface at the recess.

This embodiment has the advantage that possible high forces or loads acting on the unit, such as can occur on an accident, for example, can be transmitted via the stopper section and the abutment surfaces in a controlled, i.e. predeterminable, manner onto the crossmember and thus onto the vehicle chassis.

In a further aspect of the invention, which is not claimed, such a connector part with a stopper section is provided independently of the kind of connection between the at least one unit bearing and the crossmember. In accordance with this aspect of the invention, a unit support is accordingly provided for a unit, in particular for a transmission in a motor vehicle, comprising a crossmember and at least one unit bearing between the crossmember and the unit, wherein the at least one unit bearing comprises a connector part which can be connected to the unit at one end and which comprises a stopper section at the oppositely disposed end, wherein the stopper section can be movably arranged within a recess in the crossmember, with the movability of the stopper section being limited in at least one direction by at least one abutment surface at the recess.

In an embodiment of the invention, the connector part is formed from metal and is coated or enveloped by an elastomer in at least the region of the stopper section. In this embodiment, the forces acting on an abutment movement are damped with respect to the crossmember.

In an embodiment, the stopper section has a relatively larger cross-section with respect to an adjacent section of the connector part, wherein the movability of the stopper section within the recess is limited in the X, Y and Z directions. In accordance with this embodiment, the connector part has the shape of a bolt, with the stopper section being formed by the bolt head which is arranged within a correspondingly shaped receiver in the crossmember and whose movability is limited in all directions.

In an embodiment, the crossmember and the connection part are composed of plastic, in particular of thermoplastic, in particular of fiber-reinforced polyamide. This embodiment is characterized by an advantageous ratio of stability and weight.

The unit support in accordance with the present invention is in particular suitable for units in motor vehicles such as transmissions, engines or the like.

BRIEF DESCRIPTION OF THE DRAWINGS

FIG. 1 shows a perspective representation of a unit support 1 in accordance with an embodiment of the invention. The unit support 1 comprises a crossmember 2 having two integrated unit bearings 3. The unit bearings 3 are arranged between the crossmember 2 and a transmission 4, whereby the transmission 4 is supported with respect to a body of a motor vehicle, not shown, connected to the crossmember 2.

FIG. 2 shows the unit support 1 without the transmission 4, while FIG. 3 represents an exploded view of the unit support 1. As can be recognized from the joint review of FIGS. 2 and 3, the unit bearings 3 are fastened to the crossmember 2 by a snap-in connection. For this purpose, the unit bearings 3 each comprise a connection part 5 of plastic from which four elastic snap-in hooks 7 having latching noses 8 at the end sides extend in the direction toward the crossmember 2.

Figure 1:
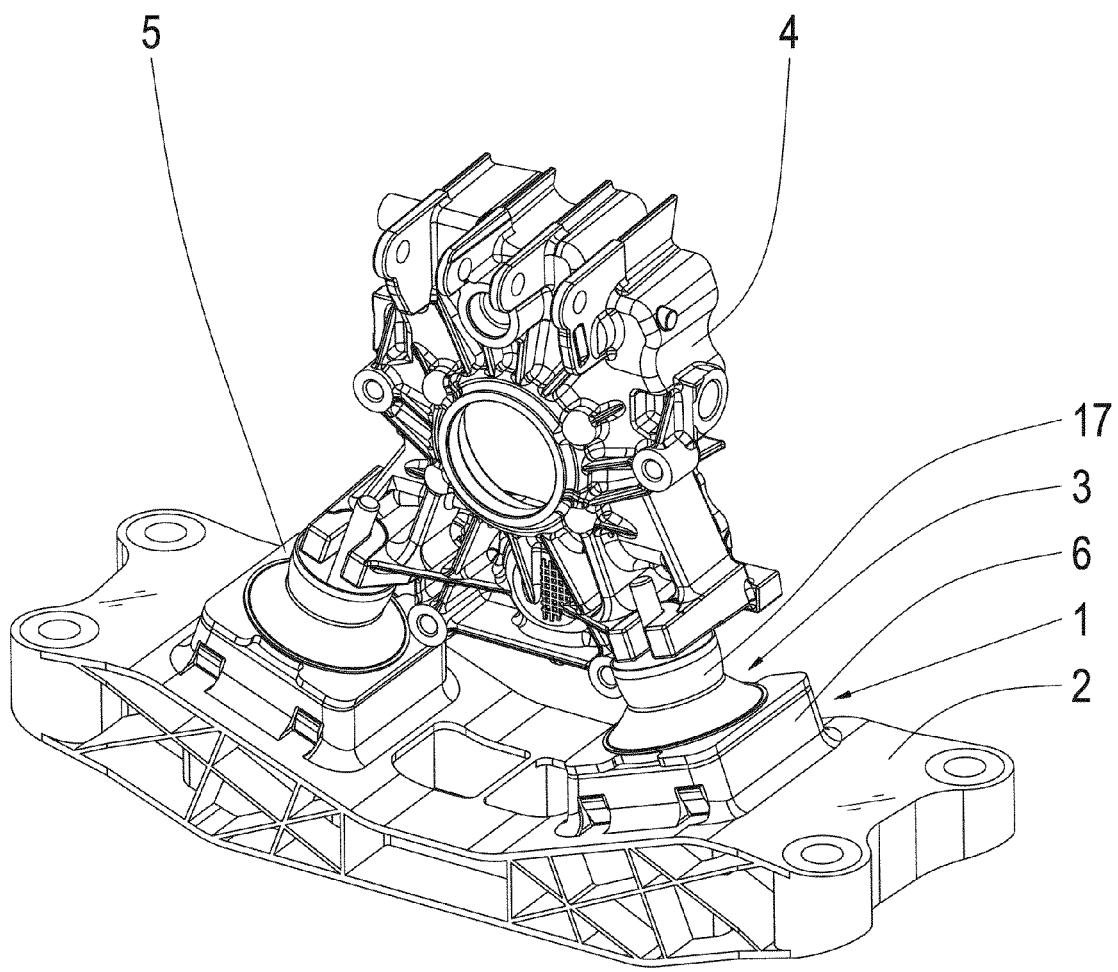
FIG. 1 a perspective representation of a unit support in accordance with an embodiment of the invention with a transmission supported thereat.
Figure 2:
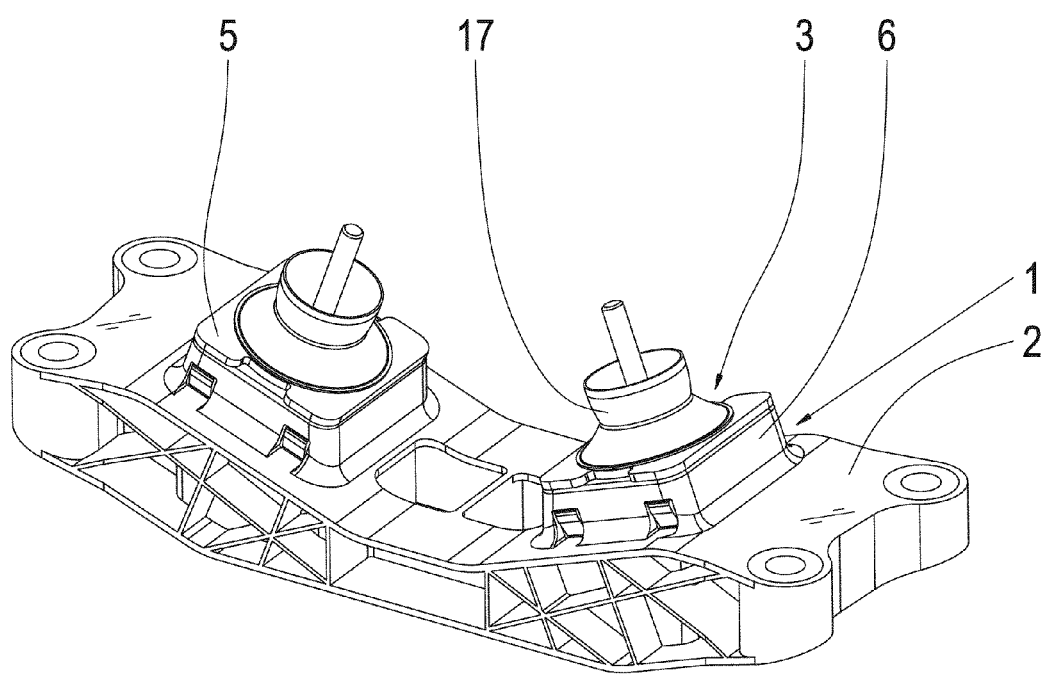
FIG. 2 a perspective representation of the unit support from FIG. 1 without a transmission.
Figure 3:
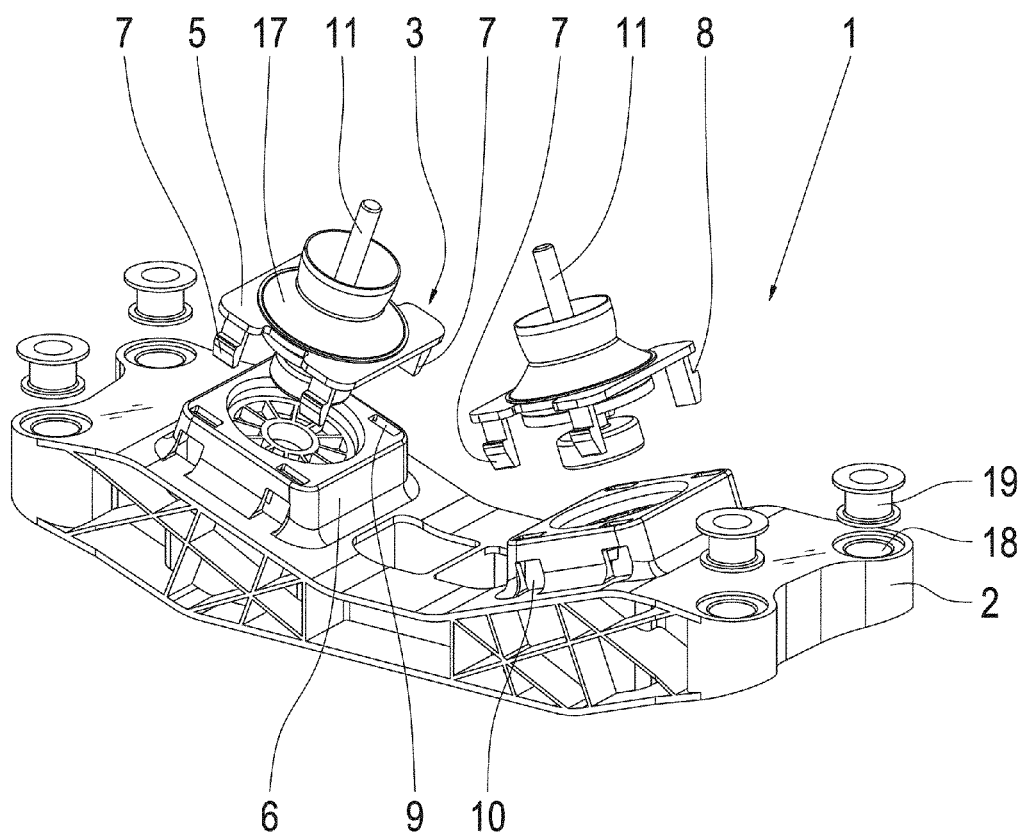
FIG. 3 an exploded representation of the unit support from FIG. 2.

On a joining together of the unit bearings 3 and the crossmember 2, the snap-in hooks 7 are introduced into corresponding first cut-outs 9 in the crossmember 2, wherein the first cut-outs 9 and the snap-in hooks 7 are configured such that the latching noses 8 are compressed on introduction into the cut-outs 9 before they move to second cut-outs 10, which extend transversely to the first cut-outs 9, and expand again, whereby the snap-in hooks 7 catch with respect to the crossmember 2 and the unit bearings 3 are connected to the crossmember 2 in a shape-fit manner.

The cut-outs 9 and 10 are provided in pedestal-like projections 6 at the upper side of the crossmembers 2, with the projections 6 being formed in one piece with the crossmembers 2 of plastic. The projections 6 and the connection part 5 are substantially congruent.

The unit bearings 3 each comprise a piston-shaped connector part 11 which substantially comprises a first cylindrical section 12 having a first diameter and a second cylindrical section having a second diameter larger relative to the first diameter, with the second cylindrical section forming a stopper section 13. The connector part 11 comprises metal and hast a rubber coating 14 at least the stopper section 13.

Figure 4:
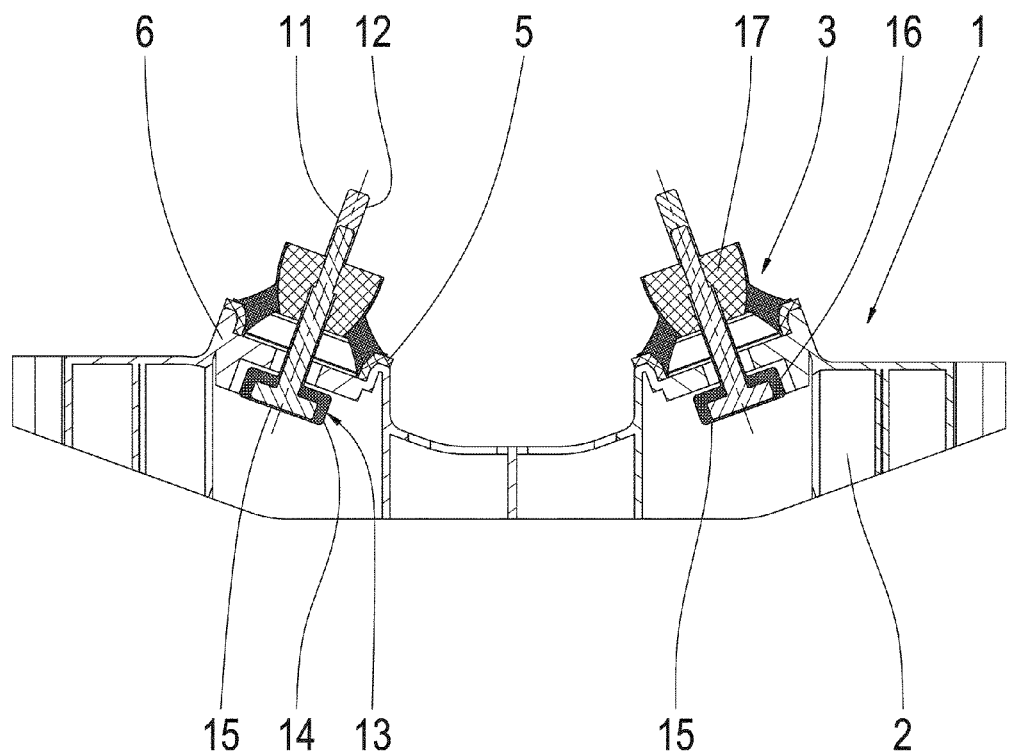
FIG. 4 a cross-section through the unit support from FIG. 2.

The first cylindrical section 12, which is configured in two parts in the embodiment, serves for the connection of the transmission 4, while the stopper section 13 serves to limit movements of the transmission 4 with respect to the crossmember 2. For this purpose, the stopper section 13 is received in a corresponding recess 15 in the crossmember 2 such as shown in FIG. 4. The movability of the stopper section 13 within the recess 15 is limited in all directions. Abruptly occurring high loads on the transmission 4—for example on an accident—are thus transmitted via the stopper section 13 onto adjacent abutment surfaces 16 within which the recess 15 is located and the resulting relative movement between the transmission 4 and the crossmember 2 is limited.

Figure 5:
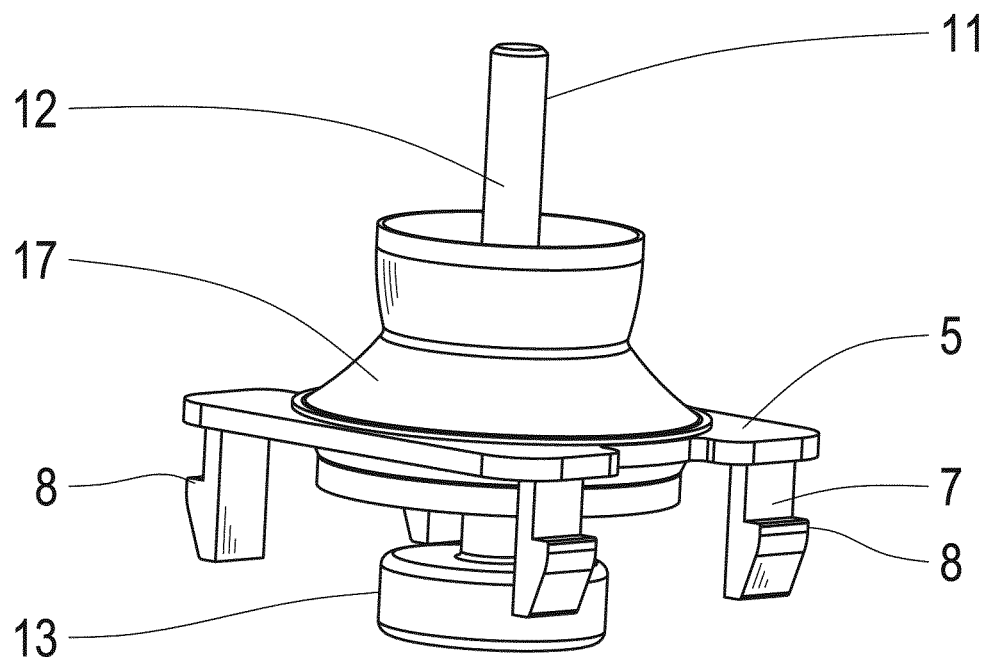
FIG. 5 a perspective representation of a unit bearing of the unit support from FIG. 2.
Figure 6:
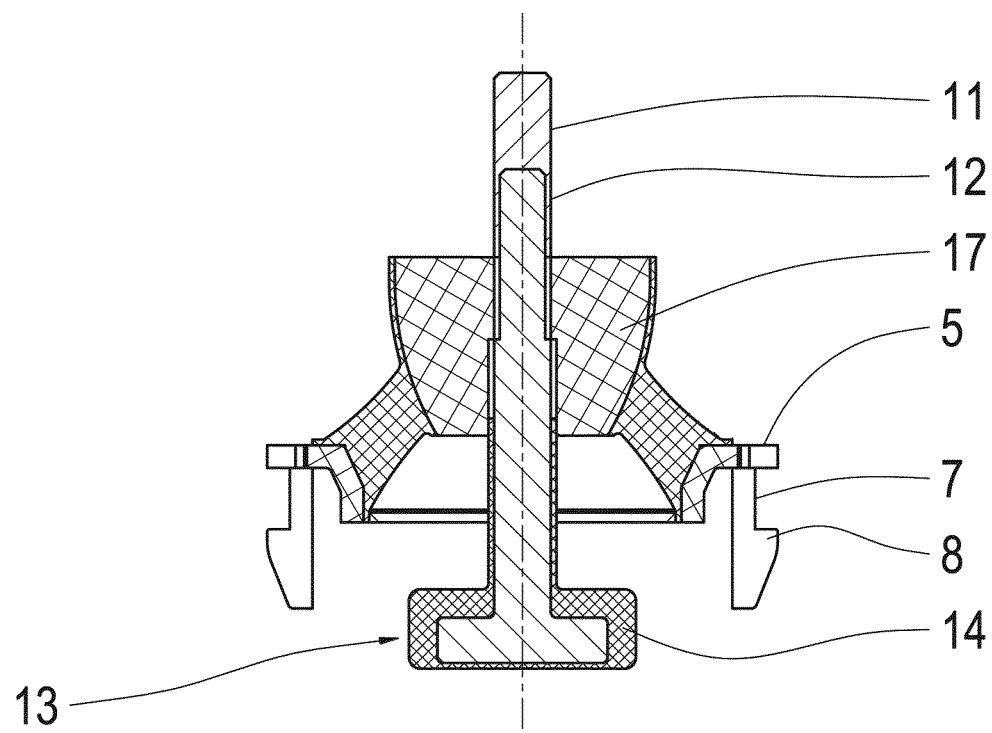
FIG. 6 a cross-section through the unit support from FIG. 5.

FIGS. 5 and 6 show the unit bearing 3 in a perspective representation or in cross-section. The unit bearing 3 comprises an elastomer body 17 for transmitting loads and vibrations between the transmission 4 and the crossmember 2, with the elastomer of the elastomer body 17 in particular being formed by rubber.

As shown in FIGS. 1 to 4, the crossmember 2 comprises a plurality of bores 18 having screw sleeves 19 received therein by means of which the crossmember 2 can be screwed to a body, not shown, of a motor vehicle.

The crossmember 2 and the plastic parts of the unit bearings 3 comprise plastic, in particular thermoplastic, in particular fiber-reinforced polyamide.

The invention claimed is:

1. A unit support, for supporting a drive unit with respect to a motor vehicle body, comprising:
   a crossmember configured for connection to a motor vehicle body, the crossmember having a recess defined therein and at least one abutment surface defined in the recess;
   at least one unit bearing disposed between the crossmember and a drive unit so as to support the drive unit, the at least one unit bearing comprising at least one elastomer body and a connector part, the at least one elastomer body transmitting loads and vibrations between the drive unit and the crossmember, the connector part configured to be connected to the drive unit at one end, the connector part having a stopper section at an opposite end, the stopper section movably arranged within the recess in the crossmember, the movability of the stopper section being limited in at least one direction relative to the crossmember by the at least one abutment surface in the recess; and
   a shape-fitting connection fastening the at least one unit bearing to the crossmember.

2. A unit support in accordance with claim 1, wherein the shape-fitting connection is formed by a snap-in connection.

3. A unit support in accordance with claim 1, wherein the crossmember has cut-outs defined therein, the at least one unit bearing comprises a connection part including at least one elastically deformable joining part configured to be hooked into respective cut-outs of the crossmember.

4. A unit support in accordance with claim 3, wherein the connection part includes at least four elastically deformable joining parts configured to be hooked into respective cut-outs of the crossmember.

5. A unit support in accordance with claim 3, wherein the joining parts are each a snap-in hook having an elastically deformable latching nose configured to be latched to the crossmember.

6. A unit support in accordance with claim 3, wherein the crossmember comprises a projection for the at least one unit bearing, the cut-outs disposed in the projection such that the projection for the at least one unit bearing is configured for receiving or fastening the connection part.

7. A unit support in accordance with claim 1, wherein the at least one elastomer body is integrated with the connection part.

8. A unit support in accordance with claim 1, wherein the connector part is metal and is coated or enveloped by an elastomer in at least the region of the stopper section.

9. A unit support in accordance with claim 1, wherein the stopper section has a relatively larger cross-section with respect to an adjacent section of the connector part such that the movability of the stopper section within the recess is limited in the X, Y and Z directions.

10. A unit support in accordance with claim 3, wherein the crossmember and the connection part are plastic.

11. A unit support in accordance with claim 3, wherein the crossmember and the connection part are thermoplastic.

12. A unit support in accordance with claim 3, wherein the crossmember and the connection part are fiber-reinforced polyamide.

13. A unit support in accordance with claim 1, wherein at least a portion of the connector part is seated in the elastomer body.

14. A unit support in accordance with claim 1, wherein the unit bearing is configured as a rubber bearing in a bearing housing.

15. A unit support in accordance with claim 1, wherein the connector part having a shape of a bolt, the stopper section being formed by the bolt head whose mobility is limited in at least one direction.

* * * * *